RECORD-REPRODUCE MODE SELECTION WITHOUT MECHANICAL RELAYS
Filed Sept. 20, 1967
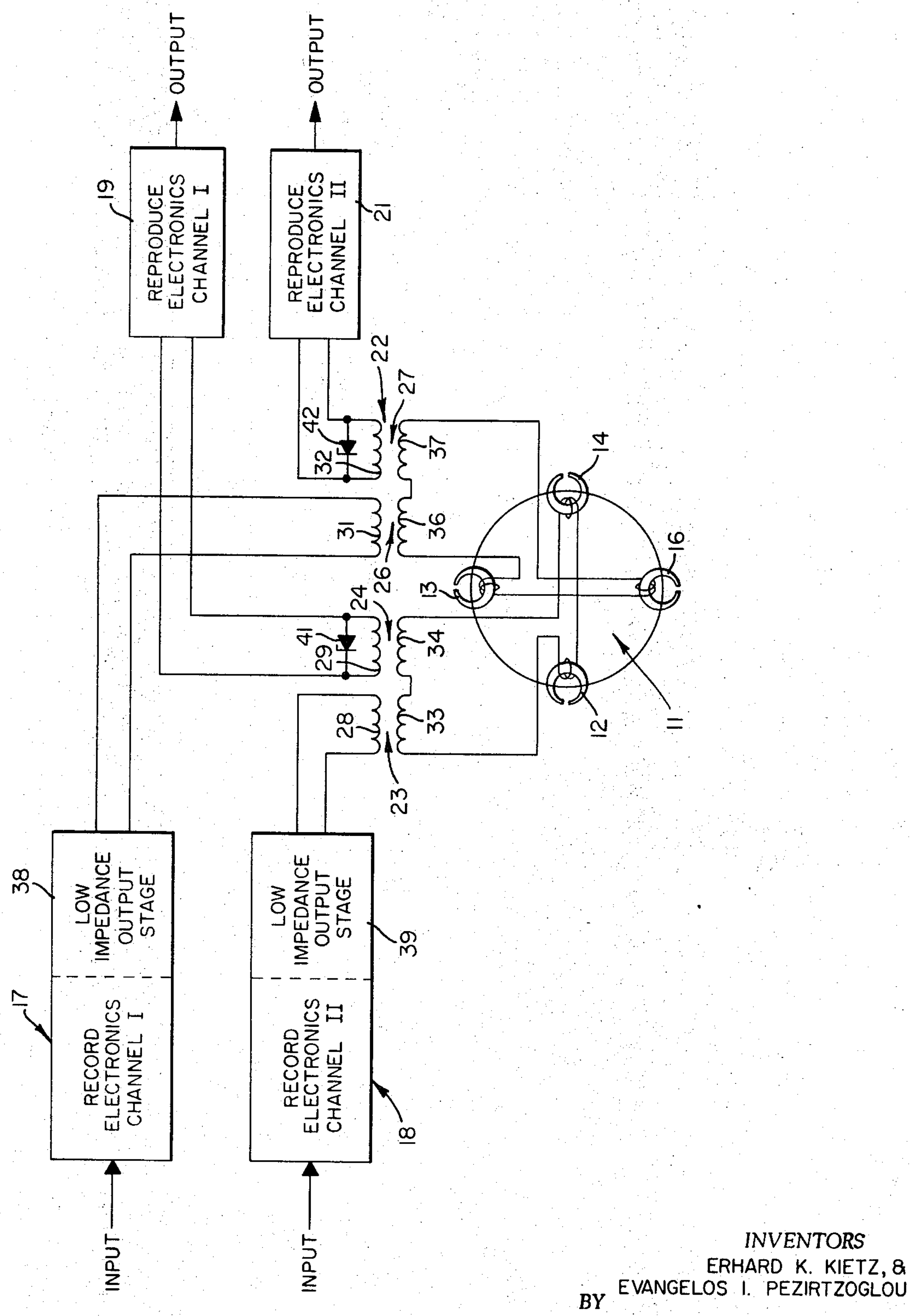
INVENTORS
ERHARD K. KIETZ, &
EVANGELOS I. PEZIRTZOGLOU
BY Robert S. Clay
ATTORNEY

3,536,856
RECORD-REPRODUCE MODE SELECTION WITHOUT MECHANICAL RELAYS

Erhard K. Kietz, Menlo Park, and Evangelos I. Pezirtzoglou, Mountain View, Calif., assignors to Ampex Corporation, Redwood City, Calif., a corporation of California Filed Sept. 20, 1967, Ser. No. 669,078
Int. Cl. G11b *15/12, 5/52;* H04n *5/78*
U.S. Cl. 179—100.2 4 Claims

ABSTRACT OF THE DISCLOSURE

A head and rotary transformer configuration for a rotary head magnetic tape recorder/reproducer which facilitates selection of the record and reproduce modes without the use of electro-mechanical change-over, or transfer relays to switch the transformer coupling between the record and reproduce electronics. By virtue of the increased reliability resulting from relay elimination, the configuration is particularly useful in airborne and space applications. The configuration also provides increased flexibility in optimizing transformer impedances and transformation ratios and is conducive to substantial simplification of the recorder/reproducer electronics.

The invention herein described was made in the course of a contract with the Department of United States Air Force.

BACKGROUND OF THE INVENTION

With rotary head magnetic tape recorder/reproducer systems the heads mounted on the rotary scanning drum are typically coupled to the record and reproduce electronics of the system by means of rotary transformers. Many of these systems employ a single set of four heads circumferentially spaced on the drum at 90° intervals for both the record and reproduce modes of operation. Under such circumstances it will be appreciated that in order to shift between the two modes of operation it is necessary to selectively shift the transformer coupling of the heads between the record and reproduce electronics of the system. Heretofore the change in coupling has been accomplished by means of electro-mechanical change-over, or transfer relays serving to couple windings of the rotary transformers to the record on reproduce electronics. More particularly, in one arrangement the windings of the respective heads are coupled each to a different one of rotor windings of the rotary transformers. The corresponding stator windings are connected to sets of wipers of the change-over relays which are selectively operable between sets of relay contacts respectively connected to the outputs of the record electronics and inputs of the reproduce electronics of the system. The wipers are selectively operable between the record and reproduce contacts in response to actuation of a record/reproduce mode selector switch associated with the relays. It will be appreciated that an arrangement of the type just described is relatively complex by virtue of there being a relay associated with each head and separate record and reproduce channels associated with each relay. In other words, there are four relays, four record channels, and four reproduce channels required in the arrangement. In order to obviate such complexity an alternative arrangement employs pairs of opposed heads in parallel and a pair of change-over relays for selectively switching the rotary transformer coupling between a pair of record electronics channels and a pair of reproduce electronics channels. It is of importance to note that despite the relative simplicity of the latter arrangement, electro-mechanical relays are still employed to facilitate selection of the record and reproduce modes. Electro-mechanical relays seriously detract from the reliability of the record/reproduce system, which reliability is of particular importance in airborne and space applications. Moreover, by virtue of each pair of opposed heads being connected in parallel, their combined impedance is low. Consequently, in the reproduce or playback mode, a relatively large transformer ratio is required which is difficult to achieve for very wide bandwidths. In the record mode, a relatively large total current must be supplied from the output of each record channel to the corrsponding pair of paralleled heads.

SUMMARY OF THE INVENTION

The present invention is concerned with a head and rotary transformer configuration which facilitates selection of the record and reproduce modes without electro-mechanical changeover relays. The configuration of the present invention is conducive to use with record and reproduce electronics of simplified design comparable to those employed with the paralleled opposed head configuration and yet enables a very wide bandwidth to be realized. Increased flexibility in optimizing the rotary transformer impedances and transformation ratios is also provided, and the current requirements of the record electronics is much less than for the parallel head configuration.

In the accomplishment of the foregoing, the configuration of the present invention generally includes four rotary transformers, each having rotor and stator windings, two of such transformers being employed for record and two being employed for reproduce. The windings of a first pair of diametrically opposed heads and the rotor windings of one record transformer and one reproduce transformer are connected in series. Similarly, the windings of the second pair of diametrically opposed heads and the rotor windings of the second record transformer and second reproduce transformer are connected in series. The stator windings of the first and second record transformers are coupled to the outputs of first and second channels of the record electronics. The stator windings of the first and second reproduce transformers are coupled to the inputs of first and second channels of the reproduce electronics. Breakdown diodes or equivalent devices are connected across the stator windings of the reproduce transformers such that in the record mode, when a signal is applied to the record electronics and record current is induced in the heads by means of the record transformers, the voltage simultaneously generated across the stator windings of the reproduce transformers is sufficient to cause the diodes to conduct. Thus, in the record mode the rotor windings of the reproduce transforemrs in series with the heads present a low impedance to the record current. In addition, the conducting diodes protect components at the inputs of the reproduce electronics from possible damage due to the relatively high voltage which would devolop without the diodes. In the reproduce mode, the voltage induced in the stator windings of the reproduce transformer is insufficient to cause the diodes to conduct. Consequently, the reproduce transformers couple the signals from the heads to the reproduce electronics. During reproduce the record transformers are effectively short circuited on the stator side by low impedance shunts provided, for example, by low impedance output stages of the record electronics which are maintained energized by their associated power supplies. Thus, in the foregoing manner transfer between the record and reproduce modes is accomplished without change-over relays.

BRIEF DESCRIPTION OF THE DRAWING

The single figure is a schematic circuit diagram of a magnetic transducer head and rotary transformer configuration, in accordance with the present invention, for selecting record and reproduce modes without electromechanical change-over relays.

DETAILED DESCRIPTION OF THE PREFERRED EMBODIMENT

Referring now to the drawing, there is shown a rotary head drum 11 having a plurality of magnetic transducer heads 12, 13, 14 and 16 mounted on its periphery at circumferentially spaced intervals of 90°. The drum successively sweeps the heads transversely across a longitudinally moving magnetic tape (not shown) to record signal information thereon, or reproduce previously recorded signal information therefrom. In the record mode the signal is supplied to the heads from channel I record electronics 17 and channel II record electronics 18 which process the signal in a conventional manner. In the reproduce mode, the reproduced signal is supplied from the heads to channel I reproduce electronics 19 and channel II reproduce electronics 21 for processing in a conventional manner. The record circuitry which precedes the channel I and II record electronics 17 and 18, and the reproduce circuitry which follows the channel I and II reproduce electronics 19 and 21 have been omitted from the drawing, such circuitry being well known in the art and having no bearing on the present invention. It should be noted, however, that the record/reproduce selection arrangement of the invention is incorporated in a complete record and reproduce system, only the terminal and input portions respectively of which are shown in the interest of simplicity of description.

In order to couple the heads 12, 13, 14 and 16 to the record and reproduce electronics of the system, there is provided a rotary transformer unit 22 having four rotary transformers 23, 24, 26 and 27 in a common housing. Such transformers respectively include stator windings 28, 29, 31 and 32 and rotor windings 33, 34, 36 and 37. In accordance with the particularly salient aspects of the invention, two of the transformers 23 and 26 are employed for record, and two transformers 24 and 27 are employed for reproduce. In addition, the rotor windings 33 and 34 of record and reproduce transformers 23 and 24 and the windings of diametrically opposed heads 12 and 14 are serially connected in a closed loop, while the rotor windings 36 and 37 of record and reproduce transformers 26 and 27 and the windings of diametrically opposed heads 13 and 16 are serially connected in a second closed loop. The stator windings 31 and 28 of record transformers 26 and 23 are respectively connected to low impedance output stages 38 and 39, such as emitter-followers, of the channel I and channel II record electronics 17 and 18. The stator windings 29 and 32 of reproduce transformers 24 and 27 are respectively connected to the inputs of the channel I and II reproduce electronics 19 and 21. The reproduce stator windings 29 and 32 are shunted by breakdown diodes 41 and 42, or equivalent devices which are rendered conducting in response to voltages thereacross of a predetermined magnitude.

In the operation of the system described hereinbefore, selection of the record mode is accomplished by the application of an input signal to the channel I and II record electronics 17 and 18, while the channel I and II reproduce electronics 19 and 21 are deenergized, i.e., disconnected from their associated power supplies. The driving current from the channel I record electronics passes through the stator winding 31 of record transformer 26 to, in turn, induce record current in rotor winding 36 which consequently also flows through the series connected diametrically opposed heads 13 and 16. The voltage generated across the stator winding 32 or reproduce transformer 27 due to the record current is sufficient to cause the breakdown diode 42 to conduct and effectively short circuit the rotor winding 37 of the reproduce transformer. The winding 37 consequently presents a low impedance to the record current supplied to the series connected heads 13 and 16. The amount of current supplied by the channel I record electronics may be therefore made relatively low. It will be further appreciated that the conducting diode 42 provides a low impedance path across the input of the channel II reproduce electronics 21 which protects input transistors thereof from possible damage due to the high voltage which would develop without the diode.

In a similar manner, the driving current from the channel II record electronics 18 passes through the stator winding 28 of record transformer 28 and induces the flow of record current in the series path which includes the diametrically opposed heads 12 and 14. Diode 41 conducts such that the input of the channel II reproduce electronics 19 is protected and the rotor winding 34 of reproduce transformer 24 presents a low impedance to the flow of record current. The current supplying capabilities of the channel II record electronics may be therefore relatively low.

To select the reproduce mode, the channel I and II reproduce electronics 19 and 21 are energized and the input signal is removed from the channel I and II record electronics 17 and 18 while at least the low impedance output stages 38 and 39 are maintained energized. The energized output stages thus provide low impedance shunt paths across the stator windings 28 and 31 of the record transformers 23 and 26. Various other appropriate measures may be taken to provide auxiliary low impedance paths across the record transformers in the reproduce mode. Consequently the rotor windings 33 and 36 of the record transformers present relatively low impedances to the flow of reproduce current supplied from the heads 12 and 14 to rotor winding 34 of reproduce transformer 24, and from the heads 13 and 16 to rotor winding 27 of reproduce transformer 27. The major portion of the reproduced signal thus appears across the stator windings 29 and 32 of the reproduce transformers 24 and 27. The reproduced signal, however, is of relatively low magnitude insufficient to render the breakdown diodes 41 and 42 conducting. The reproduced signal is hence applied to the channel I and II reproduce electronics 19 and 21.

What is claimed is:

1. A record/reproduce mode selection system for a rotary head magnetic tape recorder/reproducer of the type including a rotary head drum having a plurality of magnetic transducer heads circumferentially spaced at 90° intervals on the periphery thereof, record electronics for processing signals to be recorded by said heads on magnetic tape, and reproduce electronics for processing signals reproduced by said heads from said tape, said selection system comprising a plurality of rotary transformers each having a rotor winding and a stator winding, the stator winding of a first of said transformers connected to the output of a first channel of said record electronics, the stator winding of a second of said transformers connected to the input of a first channel of said reproduce electronics, the stator winding of a third of said transformers connected to the output of a second channel of said record electronics, the stator winding of a fourth of said transformers connected to the input of a second channel of said reproduce electronics, the rotor windings of said first and second transformers series connected in a closed loop with the windings of a first diametrically opposed pair of said heads, the rotor windings of said third and fourth transformers series connected in a closed loop with the windings of a second diametrically opposed pair of said heads, breakdown discharge devices respectively connected in parallel with the stator windings of said second and fourth transformers, said discharge devices having predetermined conducting thresholds, and means defining low impedance paths in parallel with the stator windings of said first and third transformers.

2. A record/reproduce mode selection system according to claim 1, further defined by said discharge devices being breakdown diodes.

3. A record/reproduce mode selection system according to claim 1, further defined by said means defining low impedance paths being low impedance output stages of said first and second channels of said record electronics.

4. A record/reproduce mode selection system according to claim 3, further defined by said discharge devices being breakdown diodes.

References Cited

UNITED STATES PATENTS

| | | | |
|---|---|---|---|
| 3,179,909 | 4/1965 | Cheney ----------- | 179—100.2 |
| 3,331,927 | 7/1967 | Bounsall et al. ---- | 179—100.2 |

BERNARD KONICK, Primary Examiner

J. R. GOUDEAU, Assistant Examiner

U.S. Cl. X.R.

178—6.6; 340—174.1